Figure 4:
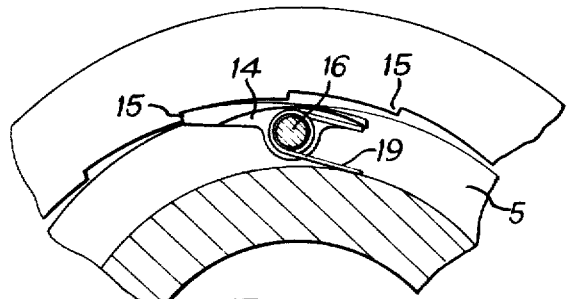

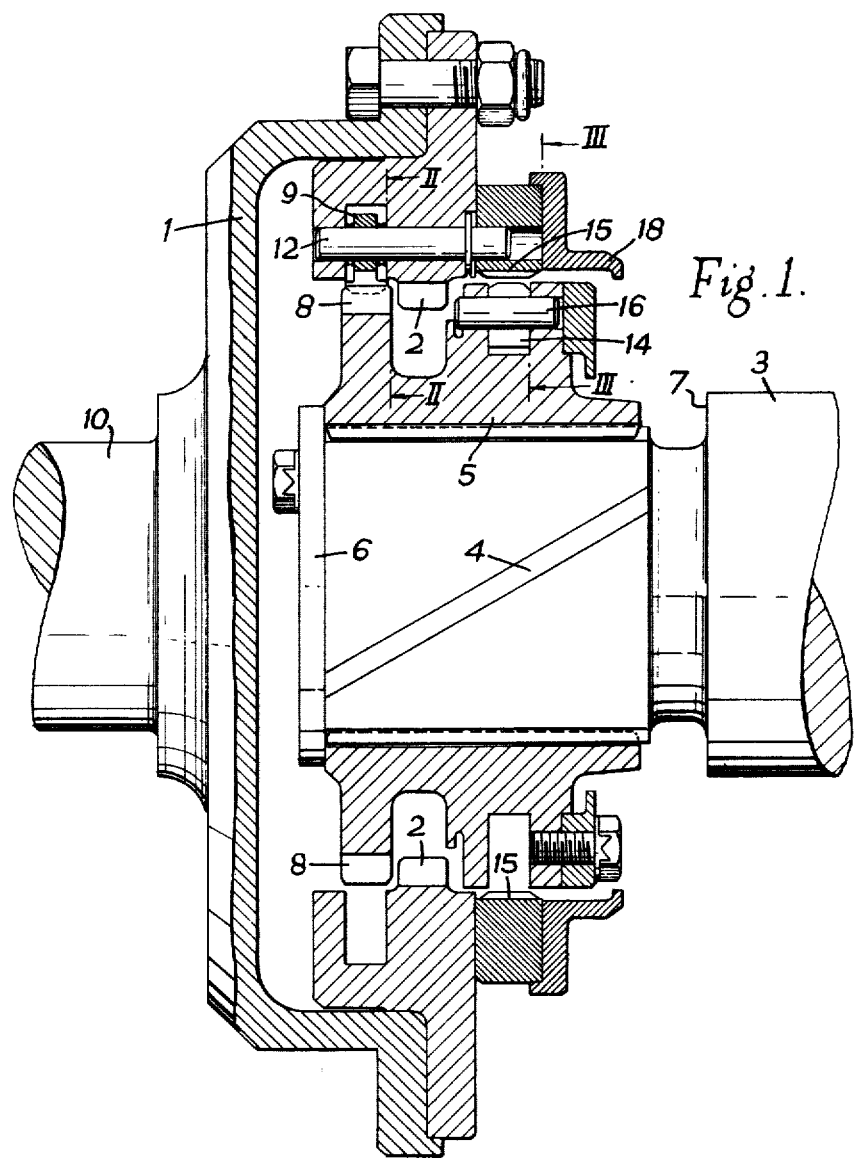

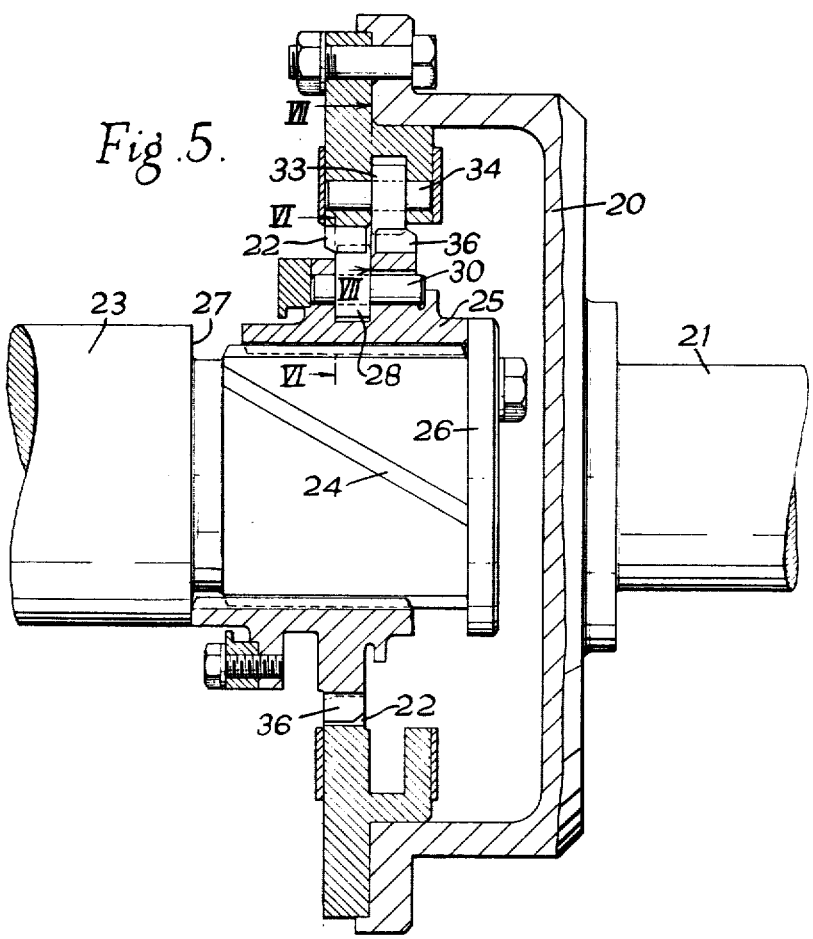

3,093,226
ROTARY SYNCHRONOUS CLUTCHES
Arthur C. Basebe, Twickenham, and Herbert A. Clements, Weybridge, England, assignors to S.S.S. Gears Limited, Middlesex, England, a British company
Filed Oct. 31, 1960, Ser. No. 65,977
Claims priority, application Great Britain Nov. 7, 1959
7 Claims. (Cl. 192—67)

This invention relates to synchronous self-shifting clutches of the type comprising a first rotary clutch member provided with jaw clutch teeth, a second rotary clutch member and an intermediate member provided with jaw clutch teeth and constrained for helical movement relative to said second clutch member whereby to bring its clutch teeth into and out of engagement with the clutch teeth of the first clutch member.

In such clutches the means for initiating toothed engagement of the intermediate member with the first clutch member when the first and second clutch members tend to over-run in one direction of relative rotation normally comprise pawls carried by one of the first and intermediate members and adapted to cooperate with ratchet teeth (which may be clutch teeth) carried by the other of said first and intermediate members, the pawls being provided with control springs for urging the pawls into ratchetting relationship with the ratchet teeth. There are, however, various disadvantages attached to the use of control springs, e.g. when the member by which the pawls are carrier is rotating at high speed the effect of centrifugal force will cause the pawls to stick on the pivot pins due to friction so that the springs are no longer effective to maintain the pawls in ratchetting engagement with the ratchet teeth. In other words, clutches of the above-described construction are not suitable for operation under conditions involving very high angular speeds of the part that carries the pawls.

The object of the present invention is to provide a clutch of the type abovementioned which overcomes the disadvantages attaching to the use of spring-loaded pawls at very high ratchetting speeds.

In accordance with the invention there is provided a synchronous self-shifting clutch comprising a first rotary clutch member provided with jaw clutch teeth, a secondary rotary clutch member, and an intermediate member provided with jaw clutch teeth and constrained for helical movement relative to the second clutch member to bring its clutch teeth into and out of engagement with the clutch teeth of said first clutch member, and means for initiating clutch engagement when said first clutch member tends to over-run said second clutch member in one direction of relative rotation, the said means comprising at least one primary pawl carried by one of said first and intermediate members and ratchet teeth on the other of said members, said primary pawl being urged, e.g. by a control spring, in the sense for engagement with said ratchet teeth and having a weight distribution such that above a predetermined angular speed range of the member by which the primary pawl is carried centrifugal force renders it incapable of ratchetting, and at least one secondary pawl carried by the said other of said first and intermediate members and ratchet teeth on said one of said members, the weight distribution of said secondary pawl being such that centrifugal force urges it into a position for ratchetting with its ratchet teeth when the angular speed of the member by which it is carried is within a predetermined higher speed range, which may overlap the first mentioned lower speed range.

Figure 3:
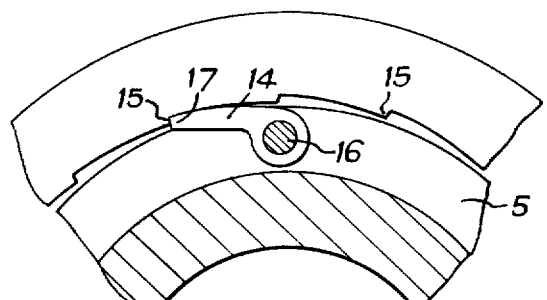
Figure 2:
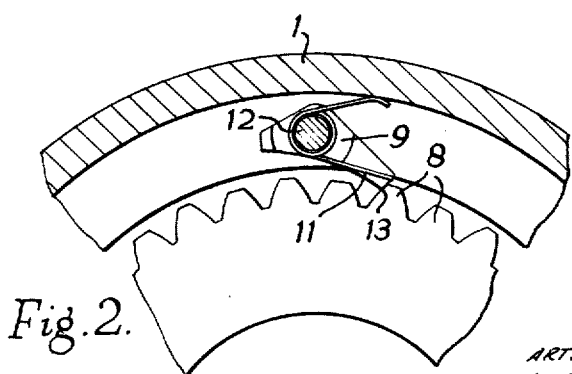
Figure 7:
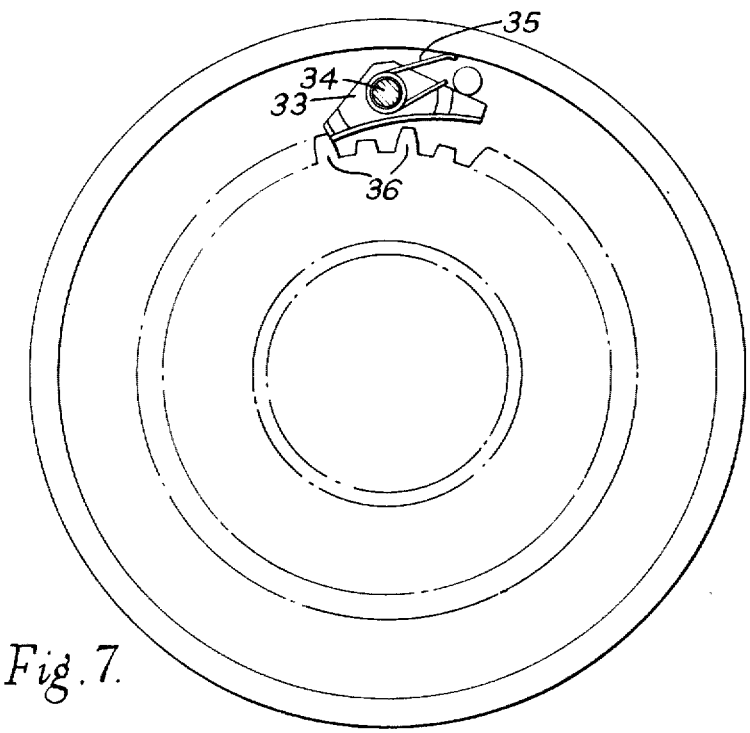
Figure 6:
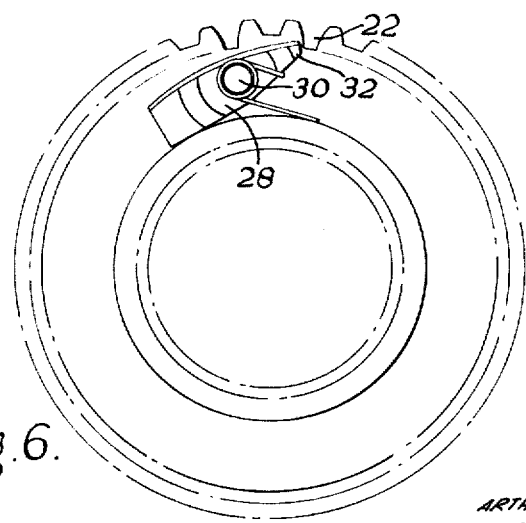

In the accompanying drawings,
FIG. 1 is a view in longitudinal section of a clutch in accordance with the invention;
FIG. 2 is a sectional view on the line II—II of FIGURE 1;
FIG. 3 is a sectional view on the line III—III of FIGURE 1;
FIG. 4 is a sectional view corresponding to FIGURE 3 and illustrating a modification of the clutch shown in FIGURES 1 to 3;
FIGURE 5 is a view in longitudinal section of another clutch in accordance with the invention; the clutch being shown in the disengaged condition in the upper half of FIGURE 5 and in the engaged condition in the lower half;
FIG. 6 is a sectional view on the line VI—VI of FIGURE 5, and
FIG. 7 is a sectional view on the line VII—VII of FIGURE 5.

Referring to FIGS. 1 to 3, the first clutch member 1 carries a ring of internal clutch teeth 2 and the second clutch member is a shaft 3 formed with external helical left-hand splines 4. The intermediate member is a clutch sleeve 5 which is mounted on the shaft 3 and which is formed with internal helical splines in engagement with the splines 4 of the shaft 3 so that the sleeve 5 is constrained for helical movement relative to the shaft 3, the said helical movement being limited by axial stops 6 and 7 on the shaft 3. The sleeve 5 carries a ring of external clutch teeth 8 which are capable of engagement with and disengagement from the clutch teeth 2 of the first clutch member 1 according to the direction of helical movement of the clutch sleeve 5.

The first clutch member 1 carries a plurality of primary pawls 9 (FIG. 2) e.g. 4 pawls arranged in diametrically opposite pairs, which in the disengaged condition of the clutch and at an angular speed of the shaft 10, to which the first clutch member 1 is connected, within a predetermined low speed range, are capable of ratchetting with respect to the clutch teeth 8 which in the case shown also serve as ratchet teeth. The primary pawls 9 are provided with control springs 11 which tend to maintain the primary pawls in ratchetting relation with their ratchet teeth 8 and the noses of the pawls 9 are so directed that upon angular movement of the shaft 10 in one direction relative to the shaft 3 one or more primary pawls 9 engage teeth 8 and shift the clutch sleeve 5 helically along the shaft 3 so as to initiate engagement of the clutch teeth 8 of the intermediate member with the clutch teeth 2, full engagement of the clutch teeth 8 and 2 being brought about by the interaction of these clutch teeth and the action of the helical splines 4.

The weight distribution of the primary pawls 9 is such that they are nose heavy and above a predetermined angular speed of the shaft 10 and the pawls 9 tend to turn on their pawl pins 12 against the action of their control springs 11 to positions in which their noses 13 are incapable of ratchetting with respect to the teeth 8.

A further ratchet mechanism is provided which (FIG. 3) comprises secondary pawls 14, e.g. 4 pawls arranged in diametrically opposite pairs, carried by the clutch sleeve 5, and a ring of internal ratchet teeth 15 carried by the first clutch member 1. The secondary pawls 14 have a weight distribution such that they are nose heavy, so that at angular speeds of the clutch sleeve 5 above a predetermined speed, which may be below the predetermined speed at which the primary pawls 9 tend to disengage, the secondary pawls 14 are turned on their pawl pins 16 by centrifugal force into positions in which their noses 17 are capable of ratchetting relative to the ratchet teeth 15 when the clutch is in a disengaged condition. The noses 17 of the secondary pawls are directed oppositely to those of the primary pawls so that if with the secondary pawls ratchetting the shaft 10 tends to rotate relative to the shaft 3 in the same direction as described with reference to the primary pawls 9 one or more of the secondary pawls 14 engage with ratchet teeth 15 and the clutch sleeve 5 is shifted helically along the shaft 3 thereby initiating inter-engagement of the clutch teeth 8 and 2.

Assume that the shaft 3 is drivably coupled to a prime mover, e.g. a gas turbine, and the shaft 10 is drivably coupled to a driven machine, e.g. a blower, which can also be driven by an alternative source of power, e.g. an electric motor.

With the system at rest, the clutch may be assumed to be in a disengaged condition (FIGURE 1) in which the clutch teeth 2 and 8 are disengaged axially from one another and the clutch sleeve 5 is up against the axial stop 6. The primary pawls 9 are in ratchetting relation with the clutch teeth 8 under the action of their control springs 11.

As soon as the prime mover begins to rotate the shaft 3 in the appropriate direction (anti-clockwise in FIGURE 2) one or more primary pawls 9 are engaged by clutch teeth 8 and the clutch sleeve 5 is shifted helically along the shaft 3 so as to bring the clutch teeth 8 cleanly into initial engagement with the clutch teeth 2, whereupon the inter-action of the clutch teeth 2 and 8 shifts the clutch sleeve 5 further along the shaft 3 until the clutch teeth 2 and 8 are fully inter-engaged, further helical movement of the clutch sleeve 5 being prevented by the axial stop 7. Torque is now transmitted from the input shaft 3 to the output shaft 10 which beings to rotate. The primary pawls 9 are now disposed axially to one side (to the left in FIGURE 1) of the clutch teeth 8. As the prime mover accelerates, the driven machine is likewise accelerated by the clutch, and at a predetermined angular speed of the shaft 10 below full speed thereof the action of centrifugal force on the nose heavy primary pawls 9 overcomes the action of their control springs 11 and turns the pawls 9 about their pivot pins 12, the noses 13 of the pawls 9 moving radially outwardly beyond the crowns of the clutch teeth 8. So long as the first clutch member continues to rotate at or above this predetermined speed the primary pawls 9 remain in this condition, viz. with their noses urged radially outward under the action of centrifugal force.

At or somewhat below the said predetermined angular speed of the shaft 10, centrifugal force acts on the nose-heavy secondary pawls 14 and causes them to turn on their pivot pins 16, the noses of the secondary pawls being then radially outward with respect to the tips of the ratchet teeth 15 but being however axially to one side of the ratchet teeth 15 since the clutch sleeve 5 which carries them is in the position corresponding to full clutch engagement. The secondary pawls 14 remain in this condition, viz. with their noses 17 urged radially outward, up to and at the full speed of the clutch sleeve 5.

If now the prime mover is decelerated, the clutch immediately disengages due to the inter-action of the clutch teeth 2 and 8 and the action of the helical splines 4, the clutch sleeve moving from the axial stop 7 to the axial stop 6, bringing the secondary pawls 14 into ratchetting relationship with their ratchet teeth 15. The primary pawls 9 are maintained by centrifugal force out of ratchetting relationship with the clutch teeth 8. The driven member now over-runs the prime mover and may continue to be driven at full speed by the motor. If now the prime mover is accelerated again beyond synchronism with the speed of the shaft 10, one or more secondary pawls 14 engage ratchet teeth 15 and the clutch re-engages.

If the prime mover is decelerated, with consequent automatic clutch disengagement, to a low speed or to rest, the secondary pawls 14 cease to be urged into ratchetting engagement by centrifugal force, and their noses will be kept clear of the associated ratchet teeth 15 due to the annulus of lubricating oil contained in the annular lip member 18 and rotating with the ratchet teeth 15 moving at high velocity over the backs of the pawls.

Should it then be required to accelerate the prime mover up to full speed in order to reconnect the drive from the prime mover to the driven machine, centrifugal force will become effective to bring the secondary pawls 14 into ratchetting engagement with the ratchet teeth 15 in readiness for effecting clutch engagement at synchronism.

The secondary pawls may if desired be provided with means, e.g. control springs for positively keeping their noses out of ratchetting engagement with their ratchet teeth until ratchetting is required. In FIGURE 4, the secondary pawls 14 are provided with control springs 19, by which the pawls 14 are urged to positions in which their noses are radially inward with respect to and hence clear of the tips of the ratchet teeth 15. So long as, with the secondary pawls 14 thus inoperative, the speed of the driven machine is sufficiently high (being rotated by another power source, e.g. an electric motor) the primary pawls 9 will be maintained in inoperative positions out of ratchetting engagement with the clutch teeth 2 and there is no ratchetting of either the primary or the secondary pawls.

In the clutch illustrated in FIGS. 5 to 7 the first clutch member 20 is connected to an input shaft 21 and carries a ring of internal clutch teeth 22. The second clutch member is an output shaft 23 formed with right-handed external helical splines 24 with which cooperate internal helical splines in a clutch sleeve 25 which is thereby constrained for helical movement relative to the shaft 23, between stops 26 and 27. The clutch sleeve 25 carries primary pawls 28 mounted on pawl pins 30 and provided with control springs 31 which urge the noses 32 of the primary pawls into ratchetting engagement with the clutch teeth 22. The first clutch member 20 carries secondary pawls 33 mounted on pawl pins 34 and provided with control springs 35 which urge the noses of the secondary pawls 33 out of engagement with clutch teeth 36 carried by the clutch sleeve 25. The primary pawls 28 are tail heavy, so that when the output shaft is rotating at a sufficiently high speed centrifugal force overcomes the action of the control spring 31 and moves the pawls 28 angularly on their pins 30, so that they are no longer capable of ratchetting. The secondary pawls 33 are also tail heavy so that when the speed of the input shaft 21 exceeds a predetermined value centrifugal force overcomes the action of the control springs 35 and moves the secondary pawls 33 angularly on their pins 34 to positions in which they are capable of ratchetting with the clutch teeth 36.

In the above-described constructions the primary pawls are made effectively slightly longer than the secondary pawls such that in the conditions (either when in rotation or in the stationary condition) in which both sets of pawls are capable of picking up ratchet teeth it is a primary pawl that picks up a ratchet tooth and initiates clutch engagement.

We claim:

1. A synchonous self-shifting clutch comprising a first rotary clutch member provided with jaw clutch teeth, a secondary rotary clutch member, and an intermediate member provided with jaw clutch teeth and constrained for helical movement relative to the second clutch member to bring its clutch teeth into and out of engagement with the clutch teeth of said first clutch member, and means for initiating clutch engagement when said first clutch member tends to over-run said second clutch member in one direction of relative rotation, the said means comprising pawl and ratchet mechanism with the pawl carried by one of said first and intermediate members and adapted to ratchet over teeth on the other of said first and intermediate members, means urging said pawl into engagement with the teeth over which it ratchets and said pawl having a weight distribution about its pivot such that above a predetermined angular speed of the member by which it is carried centrifugal force renders it incapable of ratchetting, the said means for initiating clutch engagement also comprising at least one pawl carried by said other of said first and intermediate members and ratchet teeth on the said one of said members, the weight distribution of said second mentioned pawl about its pivot being such that centrifugal force urges it into ratchetting contact with its associated ratchet teeth when the angular speed of the member by which it is carried is sufficient to create said centrifugal force.

2. A synchronous self-shifting clutch comprising a first rotary clutch member provided with clutch teeth, a secondary rotary clutch member, an intermediate member provided with clutch teeth, means constraining said intermediate member for helical movement relative to said second clutch member to bring the clutch teeth of said intermediate member into and out of engagement with the said clutch teeth of said first clutch member, and pawl and ratchet mechanism for initiating toothed engagement of said first and intermediate members when said first clutch member ends to over-run said second clutch member in one direction of relative rotation of said first and second clutch members, the said mechanism including at least one primary pawl carried by one of said first and intermediate members, and adapted for cooperation with teeth on the other of said first and intermediate members, resilient means tending to move said primary pawl to a position in which said primary pawl is capable of ratcheting when said first clutch member over-runs said second clutch member in the other direction of relative rotation of said first and second clutch members, said primary pawl having a weight distribution about its pivot such that above a predetermined angular speed range of the member by which said primary pawl is carried centrifugal force renders said primary pawl incapable of ratchetting, said mechanism also including at least one secondary pawl carried by said other of said first and intermediate members and adapted for cooperation with co-acting teeth on the said one of said first and intermediate members, the weight distribution of said secondary pawl about its pivot being such that centrifugal force urges said secondary pawl into ratchetting relationship with its said co-acting teeth when said first clutch member over-runs said second clutch member in the said other direction of relative rotation.

3. A synchronous self-shifting clutch comprising a first rotary clutch member provided with clutch teeth, a secondary rotary clutch member, an intermediate member provided with clutch teeth, means constraining said intermediate member for helical movement relative to said second clutch member to bring the clutch teeth of said intermediate member into and out of engagement with the said clutch teeth of said first clutch member, and pawl and ratchet mechanism for initiating toothed engagement of said first and intermediate members when said first clutch member tends to overrun said second clutch member in one direction of relative rotation of said first and second clutch members, the said mechanism including at least one primary pawl carried by one of said first and intermediate members, and adapted for cooperation with teeth on the other of said first and intermediate members, resilient means tending to move said primary pawl to a position in which said primary pawl is capable of ratchetting when said first clutch member over-runs said second clutch member in the other direction of relative rotation of said first and second clutch members, said primary pawl having a weight distribution about its pivot such that above a predetermined angular speed range of the member by which said primary pawl is carried centrifugal force renders said primary pawl incapable of ratchetting, said mechanism also including at least one secondary pawl carried by the said other of said first and intermediate members and adapted for cooperation with co-acting teeth on the said one of said first and intermediate members, the weight distribution of said secondary pawl about its pivot being such that centrifugal force urges said secondary pawl into a position in which it has ratchetting relationship with its said co-acting teeth when said first clutch member over-runs said second clutch member in the said other direction of relative rotation, and resilient means urging said secondary pawl to a position in which it is incapable of ratchetting over its said co-acting teeth when the member carrying said secondary pawl is rotating at a speed below that at which ratchetting is desired.

4. A synchronous self-shifting clutch comprising a first rotary clutch member provided with clutch teeth, a second rotary clutch member, an intermediate member provided with clutch teeth, means constraining said intermediate member for helical movement relative to said second clutch member to bring the said clutch teeth of said intermediate member into and out of engagement with the said clutch teeth of said first clutch member, and pawl and ratchet mechanism for initiating toothed engagement of said first and intermediate members when said first clutch member tends to over-run said second clutch member in one direction of relative rotation of said first and second clutch members, the said mechanism comprising at least one primary pawl carried by said first clutch member and co-acting ratchet teeth constituted by the clutch teeth of said intermediate member, resilient means tending to move said primary pawl to a position in which said primary pawl is capable of ratchetting when said first clutch member over-runs said second clutch member in the other direction of relative rotation of said first and second clutch members, said primary pawl having a weight distribution about its pivot such that above a predetermined angular speed range of said first clutch member centrifugal force renders said primary pawl incapable of ratchetting, said mechanism also including at least one secondary pawl carried by said intermediate member and co-acting ratchet teeth on said first clutch member, the weight distribution of said secondary pawl about its pivot being such that over a predetermined angular speed range of said intermediate member centrifugal force urges said secondary pawl into a position in which it is in ratchetting relationship with said last mentioned co-acting ratchet teeth when said first clutch member over-runs said second clutch member in the said other direction of relative rotation.

5. A synchronous self-shifting clutch comprising a first rotary clutch member provided with clutch teeth, a second rotary clutch member, an intermediate member provided with clutch teeth, means constraining said intermediate member for helical movement relative to said second clutch member to bring the said clutch teeth of said intermediate member into and out of engagement with the said clutch teeth of said first clutch member, and pawl and ratchet mechanism for initiating toothed engagement of said first and intermediate members when said first clutch member tends to over-run said second clutch member in one direction of relative rotation of said first and second clutch members, the said mechanism comprising at least one primary pawl carried by said first clutch member and co-acting ratchet teeth constituted by the clutch teeth of said intermediate member, resilient means tending to move said primary pawl to a position in which said primary pawl is capable of ratchetting when said first clutch member over-runs said second clutch member in the other direction of relative rotation of said first and second clutch members, said primary pawl having a weight distribution about its pivot such that above a predetermined angular speed range of said first clutch member centrifugal force renders said primary pawl incapable of ratchetting, said mechanism also including at least one secondary pawl carried by said intermediate member and co-acting ratchet teeth on said first clutch member, the weight distribution of said secondary pawl about its pivot being such that over an angular speed range of said intermediate member, centrifugal force urges said secondary pawl into a position in which it is in ratchetting relationship with said last mentioned co-acting ratchet teeth when said first clutch member over-runs said second clutch member in the said other direction of relative rotation, and resilient means urging said secondary pawl to a position in which it is incapable of ratchetting over its said co-acting teeth when said intermediate member is rotating at a speed below that at which ratchetting is desired.

6. A synchronous self-shifting clutch comprising a first rotary clutch member provided with clutch teeth, a second rotary clutch member, an intermediate member provided with clutch teeth, means constraining said intermediate member for helical movement relative to said second clutch member to bring the said clutch teeth of said intermediate member into and out of engagement with the said clutch teeth of said first clutch member, and pawl and ratchet mechanism for initiating toothed engagement of said first and intermediate members when said first clutch member tends to over-run said second clutch member in one direction of relative rotation of said first and second clutch members, the said mechanism comprising at least one primary pawl carried by said intermediate member and co-acting ratchet teeth constituted by the clutch teeth of said first clutch member, resilient means tending to move said primary pawl to a position in which said primary pawl is capable of ratchetting when said first clutch member over-runs said second clutch member in the other direction of relative rotation of said first and second clutch members, said primary pawl having a weight distribution about its pivot such that above a predetermined angular speed range of said intermediate member centrifugal force renders said primary pawl incapable of ratchetting, said mechanism also including at least one secondary pawl carried by said first clutch member and co-acting ratchet teeth therefor constituted by the clutch teeth of said intermediate member, the weight distribution of said secondary pawl about its pivot being such that over a predetermined angular speed of said intermediate member centrifugal force urges said secondary pawl into a position in which it is in ratchetting relationship with said last mentioned co-acting ratchet teeth when said first clutch member over-runs said second clutch member in the said other direction of relative rotation.

7. A synchronous self-shifting clutch comprising a first rotary clutch member provided with clutch teeth, a second rotary clutch member, an intermediate member provided with clutch teeth, means constraining said intermediate member for helical movement relative to said second clutch member to bring the said clutch teeth of said intermediate member into and out of engagement with the said clutch teeth of said first clutch member, and pawl and ratchet mechanism for initiating toothed engagement of said first and intermediate members when said first clutch member tends to over-run said second clutch member in one direction of relative rotation of said first and second clutch members, the said mechanism comprising at least one primary pawl carried by said intermediate member and co-acting ratchet teeth constituted by the clutch teeth of said first clutch member, resilient means tending to move said primary pawl to a position in which said primary pawl is capable of ratchetting when said first clutch member over-runs said second clutch member in the other direction of relative rotation of said first and second clutch members, said primary pawl having a weight distribution about its pivot such that above a predetermined angular speed range of said intermediate member centrifugal force renders said primary pawl incapable of ratchetting, said mechanism also including at least one secondary pawl carried by said first clutch member and co-acting ratchet teeth therefor constituted by the clutch teeth of said intermediate member, the weight distribution of said secondary pawl about its pivot being such that over a predetermined angular speed of said intermediate member centrifugal force urges said secondary pawl into a position in which it is in ratchetting relationship with said last mentioned co-acting ratchet teeth when said first clutch member over-runs said second clutch member in the said other direction of relative rotation, and resilient means urging said secondary pawl to a position in which it is incapable of ratchetting over its said co-acting teeth when said first clutch member is rotating at a speed below that at which ratchetting is desired.

References Cited in the file of this patent
UNITED STATES PATENTS

| | | |
|---|---|---|
| 2,559,740 | Sinclair | July 10, 1951 |
| 2,761,325 | Short | Sept. 4, 1956 |
| 2,971,621 | Sinclair et al. | Feb. 14, 1961 |

UNITED STATES PATENT OFFICE
CERTIFICATE OF CORRECTION

Patent No. 3,093,226            June 11, 1963

Arthur C. Basebe et al.

It is hereby certified that error appears in the above numbered patent requiring correction and that the said Letters Patent should read as corrected below.

Column 1, line 30, for "carrier" read -- carried --; column 3, line 28, for "beings" read -- begins --; column 4, line 40, for "spring" read -- springs --; column 5, line 20, for "ends" read -- tends --.

Signed and sealed this 7th day of January 1964.

(SEAL)
Attest:

ERNEST W. SWIDER
Attesting Officer

EDWIN L. REYNOLDS
Acting Commissioner of Patents